United States Patent [19]

DeBons et al.

[11] Patent Number: 4,611,659

[45] Date of Patent: Sep. 16, 1986

[54] OXIDIZED ALKALI LIGNINS AND THEIR USE IN ENHANCED OIL RECOVERY

[75] Inventors: Francis E. DeBons, Richmond, Tex.; Larry D. Pedersen, Canal Winchester, Ohio; David K. Olsen, Bartlesville, Okla.; William C. Richardson, Bellaire, Tex.

[73] Assignees: Getty Oil Company, Houston, Tex.; Reed Lignin, Inc., Greenwich, Conn.

[21] Appl. No.: 626,750

[22] Filed: Jul. 2, 1984

[51] Int. Cl.$^4$ .............................................. E21B 43/22
[52] U.S. Cl. .................................... 166/274; 166/275; 252/8.554
[58] Field of Search ........... 166/273, 274, 275, 305 R, 166/; 252/8.55 D

[56] References Cited

U.S. PATENT DOCUMENTS

| | | | |
|---|---|---|---|
| 1,823,440 | 9/1931 | DeGroote | 252/8.55 D |
| 3,664,419 | 5/1972 | Holm | 166/273 X |
| 4,006,779 | 2/1977 | Kalfoglou | 166/273 X |
| 4,133,385 | 1/1979 | Kalfoglou | 166/273 |
| 4,273,191 | 6/1981 | Hradel | 166/275 X |
| 4,313,500 | 2/1982 | Johnson, Jr. et al. | 166/273 |
| 4,463,806 | 8/1984 | Hurd | 166/274 |

*Primary Examiner*—George A. Suchfield
*Attorney, Agent, or Firm*—Arnold, White & Durkee

[57] ABSTRACT

A method of enhanced oil recovery comprising injecting a surfactant system comprised of an oxidized alkali lignin and an anionic and/or nonionic surfactant into a formation containing oil and producing the oil thus mobilized.

7 Claims, No Drawings

OXIDIZED ALKALI LIGNINS AND THEIR USE IN ENHANCED OIL RECOVERY

This invention concerns an enhanced oil recovery (EOR) process which utilizes a combination of surfactants. More particularly, this invention is directed to an enhanced oil recovery process using a surfactant system that includes an oxidized alkali lignin. The invention is also directed to compositions useful in enhanced oil recovery methods.

BACKGROUND OF THE INVENTION

Petroleum is produced from subterranean formations through wells penetrating the formation. Initially natural reservoir pressure may be sufficient to cause the oil to flow to the surface. As natural reservoir pressure declines due to production from the reservoir, various forms of artificial lift may be employed to bring to the surface the oil which flows into the well bores. This phase of production is usually termed primary.

Typically, during the primary production period of a reservoir only 10 to 30% of the oil initially in place may be economically recovered. As the production rate from a reservoir falls near the level at which it is no longer economic to operate the field, active steps, usually termed secondary, are taken to increase recovery. In some instances, secondary recovery techniques may be employed from the time of initial production from a reservoir to optimize recovery.

The most common form of secondary recovery is the process known as waterflooding. In a waterflood project, water is injected into the oil producing formation through injection wells, repressurizing the formation and sweeping oil which would not have otherwise been produced into production wells. Such a procedure will usually allow the economic production of an additional 10 to 30% of the oil originally in place.

As is readily seen, a reservoir may have as much as 80% of the original oil in place still unproduced after primary and secondary operations have terminated. The increasing scarcity of crude oil and its rising price have led to the development of various techniques intended to allow further production from reservoirs which have been depleted by primary and secondary operations. These operations aimed at enhanced oil recovery (EOR) from conventionally depleted reservoirs are generally termed tertiary.

Among the most promising of tertiary recovery methods are processes wherein a solution of surfactants is injected into the reservoir. The surfactant solution mobilizes the oil remaining in place after conventional production and allows it to be swept into production wells.

To date most enhanced oil recovery surfactant systems have used a petroleum sulfonate or a blend of two or more petroleum sulfonates. Typically, the average equivalent weight of a petroleum sulfonate or the blend of petroleum sulfonates useful in enhanced oil recovery operations is about 400. A common technique is to use a blend of a water soluble petroleum sulfonate and an oil soluble petroleum sulfonate. The correct combination of the two petroleum sulfonates yields a stable micellar solution which lowers the interfacial tension between the crude oil and surfactant solution and is capable of mobilizing the residual oil in the formation. This form of chemical or surfactant flooding is called low tension flooding.

Another form of chemical or surfactant flooding utilizing petroleum sulfonates employs a phase partitioning surfactant system. Such a system operates through the formation of a middle phase microemulsion comprised of both the surfactant and crude oil. Phase partitioning surfactant systems generally require higher surfactant concentration than low tension systems and a cosolvent such as a $C_3$ to $C_8$ alcohol.

Still another form of chemical flooding utilizes so called oil soluble surfactant systems. Such systems are well known and are typified by Marathon Oil Company's Maraflood TM and Union Oil Company's soluble oil process.

A combination of increased interest in enhanced oil recovery due to decreasing crude oil supplies and the scarcity and escalating cost of surfactants has generated research into non-conventional surfactants. Among such surfactants, derivatives of lignin, a phenylpropane polymer which comprises about 17 to 30% of wood, have attracted the attention of researchers for a number of years. As early as 1931, U.S. Pat. No. 1,823,440 issued disclosing a method of enhanced oil recovery involving the use of wood sulfite liquor. More recently, lignin sulfonates have been disclosed as sacrificial agents used to inhibit the deposition of the more costly petroleum sulfonates on the formation. See e.g., U.S. Pat. No. 4,006,779. The present invention allows a significant portion of the expensive petroleum sulfonate in a chemical flood to be replaced with an inexpensive non-petroleum based surfactant while still retaining comparable oil recovery efficiency.

The present inventors have found that when alkali lignins have been chemically modified by oxidation to be soluble at neutral pH, they can be used effectively in enhanced oil recovery surfactant systems. Other workers have described the use of sulfonated alkali lignins and oxidized sulfonated alkali lignins as sacrificial agents for enhanced oil recovery. See, U.S. Pat. Nos. 4,006,779, 4,133,385 and 4,196,777. The prior art does not describe the utility of oxidized alkali lignins in enhanced oil recovery.

SUMMARY OF THE INVENTION

The present invention is directed to a method and to compositions useful therein for the enhanced recovery of oil from a subterranean formation having at least one injection well and at least one production well. A surfactant system, comprised of an anionic or nonionic surfactant or a mixture of two or more surfactants, which may also include a cosurfactant such as an alcohol, and an oxidized alkali (Kraft) lignin is injected into the producing formation. The surfactant is then driven through the formation toward the producing well. The oil mobilized by the advancing surfactant is produced through the production well.

DETAILED DESCRIPTION

Preparation of Oxidized Alkali Lignins

The instant invention utilizing surfactants derived from lignins allows enhanced oil recovery operations to be carried out with comparable oil recovery efficiency to state of the art chemical floods utilizing petroleum sulfonates. The advantages of the invention are realized in the lower cost and more abundant supply of the non-petroleum based lignin surfactants utilized in the injected surfactant system. One component of the surfactant system used in the method of the instant invention is a modified derivative of an alkali lignin. In general, lignin is a complex phenolic polyether containing many different functional groups including carboxyls, carbonyls and alcoholic and phenolic hydroxyls. Lignins are naturally occurring in wood and are by-products of the pulping industry.

The literature describes two broad classes of lignins. See for example, The Kirk-Othmer Encyclopedia of Chemical Technology. One class, lignosulfonates or sulfite lignins, is generally prepared by cooking wood chips under pressure in a solution of sulfurous acid and sodium bisulfite. A second class of lignins, the so-called Kraft or alkali lignins, is obtained by cooking wood chips in a pulping operation under pressure in an alkaline solution of sodium sulfide. The lignin thus separated is soluble in the alkaline solution, but precipitates when the pH is reduced to 8 or less. Such lignins will be referred to throughout the specification and claims as alkali lignins. These alkali lignins are insoluble at neutral pH and thus have little utility in aqueous surfactant systems. In fact, a typical enhanced oil recovery surfactant system is destabilized by addition of even small amounts of alkali lignins.

The lignin feedstocks which are useful in this invention are alkali lignins. These lignins are commercially available. For example, the Westvaco Corporation markets alkali lignins under the trade name INDULINS. To prepare the alkali lignin surfactants for use in the method of the invention, the alkali lignins are first oxidized. Oxidation or oxidized, as used here, refers to reactions having one or more of the following effects on the alkali lignin. Oxidation results in the formation of carboxyl groups, alcoholic hydroxyl groups and phenolic hydroxyl groups. The oxidized alkali lignins are soluble at neutral pH and have higher molecular weights than their alkali lignin precursors. Ozone, oxygen, air, hydrogen peroxide, manganese dioxide and chlorine dioxide are among materials that may be used to oxidize the lignins. Ozone is preferred. The ozonization can be carried out by the method disclosed in U.S. Pat. No. 3,726,850, which is hereby incorporated by reference to the extent it describes the use of ozone as an oxidizing agent, to produce an oxidized product which is water soluble at a neutral pH. Example 1 below describes a typical oxidation of a sodium softwood alkali lignin using ozone as the oxidizing agent.

EXAMPLE 1

An aqueous solution of alkali lignin was prepared by adding 59.4 g. of sodium softwood alkali lignin from American Can Co. (67.3% total solids) to 340.6 g. of distilled water and adjusting to pH 11 with sodium hydroxide (50% solution). A stream of ozone in an oxygen carrier gas was bubbled through the solution at ambient temperature until a total of 4.0 g. of ozone had been added. The mixture was then concentrated by rotary evaporation to give a product having a 43% total solids content. This oxidation results in measureable changes to the alkali lignin other than solubility modifications. The acid tolerance is increased, the molecular weight is increased and the carboxylic acid content is increased. Table 1 shows the effect of the oxidation of alkali lignin with ozone on several Kraft lignin properties.

TABLE 1

| PROPERTIES OF OZONIZED KRAFT LIGNINS | | | | | | |
|---|---|---|---|---|---|---|
| | % Ozone Added | | | | | |
| | 0 | 5 | 10 | 15 | 17.5 | 20 |
| pH at Precipitation | 4.0 | 2.2 | 1.9 | 1.7 | 1.8 | 2.0 |
| Molecular Weight, Mw | 5–10,000 | 13,400 | 23,300 | 35,100 | 34,600 | 19,200 |
| Carboxylic Acid, meq/g | 2.6 | 2.42 | 3.06 | 3.26 | 3.57 | 3.79 |

One of the most significant characteristic of alkali lignins after oxidation is their solubility in neutral and acidic aqueous solutions. This solubility enables the modified alkali lignin to be formulated in an aqueous surfactant system. The unmodified alkali lignin is insoluble below pH 4 under the dilute conditions of the precipitation tests shown in Table 1 while the ozonized lignins remain in solution down to about pH 2. The tests were carried out by titrating 0.2% (wt.) solutions with 1N HCl until a precipitate formed.

Other oxidation techniques and oxidizing agents can be used. In some cases, for example when using air or oxygen, more severe reaction conditions are necessary than when carrying out the oxidation using ozone. Such oxidation reactions are known in the art.

Use of Oxidized Alkali Lignins in EOR

The oxidized alkali lignins described above are used as one component in an EOR surfactant system. The second major component of the system is an anionic or nonionic surfactant. This may be a single chemical or more likely a blend of a water soluble and an oil soluble surfactant. The system may contain only anionic surfactant, only nonionic surfactant or a combination. The word surfactant as used here and as used in the claims is to be understood to refer to both single chemical species and to combinations of two or more chemical species. For example, a typical low tension surfactant system would have as one component an oxidized alkali lignin and as a second component an anionic surfactant. Typically the anionic surfactant will be a blend of two petroleum sulfonates of different equivalent weights.

Suitable anionic surfactants include petroleum sulfonates, alkoxylated alkyl sulfonates or sulfates, alkoxylated alkylaryl sulfonates or sulfates, alkyl sulfonates, and alkylaryl sulfonates. These anionic surfactants can be neutralized with a variety of cations including sodium, potassium, ammonium, calcium, magnesium, alkyl ammoniums and alkoxy ammoniums. The preferred surfactant is a blend of an oil soluble and a water soluble petroleum sulfonate.

Nonionic surfactants that can be used include, polyglycol ethers, alkoxylated alcohols, alkoxylated carboxylic acids, alkoxylated alkyl phenols and alkoxylated amines. Esters of alkoxylates and amides can also be used.

The choice of the particular surfactant or surfactants is governed by reservoir conditions such as temperature, brine concentration and composition, and crude oil composition. Additionally the choice of EOR system is important. For example oil soluble systems will require a more lipophilic surfactant than a low tension system. Other factors include concentration of the surfactant system in the injected slug and the nature and relative amounts of the other components present.

Some EOR surfactant systems employ as a third component, a cosolvent or stabilizer. For example, phase partioning EOR systems typically include a $C_3$ to $C_8$ alcohol. Among the suitable cosolvents are alcohols, amides, esters, ethers, aldehydes, ketones, alkoxylated alcohols, sulfated or sulfonated alcohols and sulfated or sulfonated alkoxylated alcohols.

TABLE 2

PROPERTIES OF PETROLEUM SULFONATE/OZONIZED KRAFT LIGNIN BLENDS

| Concentration, Wt. % Active | | | | Phase Stability | IFT, millidynes/cm |
|---|---|---|---|---|---|
| TRS-18 | TRS-40 | Lignin | Lignin Type | | |
| 0.92 | 1.08 | — | — | S | 53 |
| 0.46 | 0.54 | — | — | S | 47 |
| 0.46 | 0.54 | 1.00 | Kraft | U | — |
| 0.46 | 0.54 | 1.00 | Ozonized Kraft (10% Ozone) | S | 10 |

An example of the use of oxidized alkali lignins in an aqueous enhanced oil recovery surfactant system is shown in Table 2. The combination of the petroleum sulfonates TRS-18 and TRS-40 from the Witco Chemical Co. and 20% field brine/80% fresh water is an effective surfactant system for an Illinois field. TRS-40 is a water soluble petroleum sulfonate having an average equivalent weight of approximately 340. TRS-18 is an oil soluble petroleum sulfonate having an average equivalent weight of approximately 500. The 2% combination of TRS-18 and 40 is considered a low concentration surfactant system and the system has desirable enhanced oil recovery properties whether formulated at 1% or at 2% active concentration. As Table 2 shows alkali lignin itself destabilizes the petroleum sulfonate combination, but the ozonized lignin blend remains stable in the 20% brine. Table 3 shows the compositions of the brine and fresh water used as blends in formulating the surfactant system.

TABLE 3

WATER ANALYSES

| | Concentration, ppm | |
|---|---|---|
| | Brine | Fresh Water |
| $Na^+$ | 13,000 | 18 |
| $Ca^{+2}$ | 340 | 74 |
| $Mg^{+2}$ | 300 | 17 |
| $Cl^-$ | 19,650 | 130 |
| $SO_4^{-2}$ | 2,400 | 105 |
| Total Dissolved Solids | 35,000 | 344 |

The most important laboratory test for the effectiveness of a enhanced oil recovery chemical additive is a coreflood. A core of sandstone, limestone or crushed sand is filled with brine, oil saturated and waterflooded to prepare it for the test of a chemical system. A small slug of surfactant solution is injected into the core and followed by a mobility control polymer solution. The surfactant releases oil trapped by viscous and capillary forces and allows the oil to be swept out of the core by the flowing water. If the surfactant is properly formulated, well over half of the trapped waterflood residual oil can be recovered by a small slug of surfactant.

In these tests a two by two by twelve inch Berea sandstone core which has been encased in epoxy was evacuated and filled with the brine described in Table 3. The brine filled core was then saturated with Illinois crude oil having a viscosity of about 12 centipoise and a density of about 0.86 g/ml. The oil saturation was reduced from about 0.68 to about 0.35 by waterflooding with the same brine. Chemical floods were done using the surfactants described below using a 0.2 pore volume injection of surfactant, which was generally dissolved in 20% brine/80% fresh water. The oxidized lignins were prepared as in Example 1. The surfactants contained 0.14% of a partially hydrolyzed polyacrylamide (NalFlo 550, Nalco Chemical Company) as a viscosity enhancer. Each surfactant slug was followed by continuous injection of 0.15% NalFlo 550 in fresh water as a mobility control agent. The oil production was generally completed between 0.3 and 1.3 pore volumes of fluid injected. The percentage of waterflood residual oil recovered by the surfactant system is called tertiary oil recovery.

The important property of oxidized alkali lignins for enhanced oil recovery is that they can be used in place of a significant part of the surfactant system. They can replace as much as half of the low concentration petroleum sulfonate system without a significant reduction in the tertiary oil recovery. Thus a great economic advantage accrues as alkali lignins can be obtained and oxidized at a fraction of the price of petroleum sulfonates or other surfactants. Table 4 shows some of the coreflood results obtained by substituting several ozonized alkali lignins for half of the petroleum sulfonate surfactant system. There is clearly an improvement in oil recovery over the 1% petroleum sulfonate surfactant system with several ozonized lignins. The oil recoveries approach that of the starting 2% petroleum sulfonate blend. The cost of the injection solution, which contains only half the original petroleum sulfonate, is substantially reduced.

TABLE 4

TERTIARY OIL RECOVERY FOR VARIOUS OZONIZED KRAFT LIGNINS

| Concentration, Wt % Active | | | | Tertiary |
|---|---|---|---|---|
| TRS-18 | TRS-40 | Lignin | % Ozone Used | Recovery, % |
| 0.46 | 0.54 | — | — | 72 |
| 0.46 | 0.54 | 1.0 | 0 | Unstable |
| 0.46 | 0.54 | 1.0 | 5 | 75 |
| 0.46 | 0.54 | 1.0 | 10 | 77* |
| 0.46 | 0.54 | 1.0 | 15 | 77** |
| 0.46 | 0.54 | 1.0 | 17.5 | 77 |
| 0.46 | 0.54 | 1.0 | 20 | 73* |
| 0.92 | 1.08 | — | — | 79 |

*Average of two results
**Average of three results

Although a wide range of ozone levels was used, Table 4 demonstrates that this surfactant system does not work equally well with every lignin product. As a result, optimization experiments on alkali lignin oxidation will be required for different field conditions and different surfactant systems. The Illinois low concentration surfactant system is shown here simply as an example of the benefit to be gained by using oxidized alkali lignins in enhanced oil recovery surfactant systems.

An example of the utility of oxidized alkali lignins in a different type of surfactant system, a phase partitioning surfactant system, is shown in Table 5. The 4.96% system, which contains 1.5% primary amyl alcohol (mixed isomers), was designed for an Oklahoma field. At this higher concentration of surfactant, a lower pore volume surfactant slug is required to obtain high oil recovery. The data in Table 5 shows at two different slug sizes that 20% of the petroleum sulfonate alcohol system can be replaced by ozonized Kraft lignin without decreasing the oil recovery of the surfactant slug.

TABLE 5
TERTIARY OIL RECOVERY FOR AN OZONIZED KRAFT LIGNIN IN A PHASE PARTITIONING SURFACTANT SYSTEM

| Composition, Wt. % Active | | | | | | |
|---|---|---|---|---|---|---|
| TRS-18 | TRS-40 | PMA* | Lignin | % Ozone | Vp | Er, % |
| 1.52 | 1.94 | 1.5 | — | — | 0.05 | 52 |
| 1.21 | 1.55 | 1.2 | 1.0 | 15 | 0.05 | 54 |
| 1.52 | 1.94 | 1.5 | — | — | 0.10 | 72 |
| 1.21 | 1.55 | 1.2 | 1.0 | 15 | 0.10 | 70 |

*Primary Mixed Amyl Alcohols

The two coreflood examples above were chosen to represent typical enhanced oil recovery surfactant systems. Other types of systems such as oil soluble or water external micro-emulsion systems will also benefit from oxidized alkali lignin substitution. Oil soluble systems utilize hydrocarbons such as crude oil or distillates as the carrier for the surfactant system.

The intent of the instant invention is to teach the use of oxidized alkali lignins in enhanced oil recovery surfactant systems in place of part of the usual EOR surfactant regardless of the name applied to the surfactant system. In other words, oxidized alkali lignins have general utility in enhanced oil recovery surfactant systems and should not be thought to be limited to the specific types of surfactant systems discussed here.

The foregoing description has been directed to particular embodiments of the invention for the purposes of illustration and explanation. Those skilled in the art will readily appreciate modifications and changes in the procedures set forth without departing from the scope and spirit of the invention. Applicants' intent is that the following claims be interpreted to embrace all such modifications and variations.

What is claimed is:

1. A method of enhanced oil recovery from a subterranean formation containing oil and having at least one production well and at least one injection well comprising:
    injecting into said formation a surfactant system comprising:
        a surfactant selected from at least one of the classes of anionic and nonionic surfactants and
        an ozonized alkali lignin;
    driving said surfactant system through said formation; and
    producing the oil mobilized by said surfactant system through said production well.

2. The method of claim 1 wherein said surfactant system is aqueous.

3. The method of claim 2 wherein said surfactant system is further comprised of a cosolvent.

4. The method of claim 1 wherein said surfactant is anionic.

5. The method of claim 4 wherein said surfactant is a petroleum sulfonate or a mixture of petroleum sulfonates.

6. The method of claim 1 wherein said surfactant is nonionic.

7. A method of enhanced oil recovery from a subterranean formation containing oil and having at least one production well and at least one injection well comprising:
    injecting into said formation a surfactant system comprising:
        an anionic surfactant and
        an ozonized alkali lignin;
    driving said surfactant system through said formation; and
    producing the oil mobilized by said surfactant system through said production well.

* * * * *